US005874172A

United States Patent [19]

Beach et al.

[11] Patent Number: 5,874,172

[45] Date of Patent: Feb. 23, 1999

[54] OXIDATIVE AGE RESISTANCE OF SURFACE OXIDIZED ROLLER

[75] Inventors: Bradley Leonard Beach; Jean Marie Massie; Johnny Dale Massie, II; Ronald Lloyd Roe, all of Lexington, Ky.

[73] Assignee: Lexmark International, Inc., Lexington, Ky.

[21] Appl. No.: 979,600

[22] Filed: Nov. 26, 1997

Related U.S. Application Data

[60] Provisional application No. 60/046,884, filed May 14, 1997.

[51] Int. Cl.[6] .............................. B32B 27/40

[52] U.S. Cl. .................. 428/423.1; 428/36.9; 428/36.91; 428/425.8; 430/110; 492/56; 492/59

[58] Field of Search ............................. 428/423.1, 425.8, 428/36.9, 36.91; 492/56, 59; 430/110

[56] References Cited

U.S. PATENT DOCUMENTS

| | | | |
|---|---|---|---|
| 5,248,560 | 9/1993 | Baker et al. | 428/425.8 |
| 5,300,339 | 4/1994 | Hays et al. | 428/36.9 |
| 5,434,653 | 7/1995 | Takizawa et al. | 399/284 |
| 5,707,743 | 1/1998 | Janes et al. | 428/423.1 |
| 5,804,114 | 9/1998 | Janes et al. | 264/82 |

FOREIGN PATENT DOCUMENTS

| | | | |
|---|---|---|---|
| 0 801 338 A2 | 10/1997 | European Pat. Off. | G03G 15/08 |
| 2-106777 A | 4/1990 | Japan | G03G 15/20 |
| 3-010266 A | 1/1991 | Japan | G03G 15/02 |
| 2 300 050 | 10/1996 | United Kingdom | G03G 15/08 |

*Primary Examiner*—D. S. Nakarani
*Attorney, Agent, or Firm*—John A. Brady

[57] ABSTRACT

An electrophotographic developer roller is made by casting urethane prepolymer mixed with a polybutadiene, a trifunctional curative, ferric chloride powder, and an antioxidant. After curing, the roller is baked, which oxidizes the outer surface. The oxidized surface layer is electrically resistive, which is desirable in a developer roller. An excellent developer roller is achieved at low production cost. The antioxidant provides stable electrical characteristics over extended time periods.

8 Claims, No Drawings

OXIDATIVE AGE RESISTANCE OF SURFACE OXIDIZED ROLLER

RELATED APPLICATIONS

This application is a continuation of U.S. Provisional patent application 60/046,884, Filed May 14, 1997.

U.S. patent application Ser. No. 08/629,855, Filed Apr. 9, 1996, now U.S. Pat. No. 5,707,743; is to rollers modified by this invention for oxidative age resistance. U.S. patent application Ser. No. 08/870,782, Filed Jun. 6, 1997, now U.S. Pat. No. 5,804,114; is a division of the foregoing Ser. No. 08/629,855, directed to process coverage. U.S. patent application Ser. No. 08/423,481, Filed Apr. 19, 1995, now pending, a counterpart of which was published as UK Patent Application 2 300 050 on Oct. 23, 1996, having some common inventors with this application, is to a developer roller having a polycaprolactone ester body and ferric chloride filler, as do the embodiments of this application.

TECHNICAL FIELD

This invention relates to developer rollers used in electrophotography, and, more specifically, to a roller and its process of manufacture having a surface with a high electrical resistivity layer.

BACKGROUND OF THE INVENTION

A functional developer roller for use in contact electrophotographic printing having a high resistance surface layer over a semi-conductive core gives excellent print performance independent of the speed of movement of the printing members (termed process speed). This is an improvement over a more common method which involves making a semi-conductive core and subsequently coating that core with a resistive material in a separate process such as spray or dip coating.

By using the novel combination of materials described in the foregoing Ser. No. 08/629,855, a high resistance surface layer over a more conductive core can be produced simply by oxidizing the roll surface. This eliminates the need for coating the conductive roll with a resistive layer in a separate process. This process is an improvement over a more common method which involves making a semi-conductive core and then subsequently coating the core with a resistive material in a separate process such as spray or dip coating. Baking is much more cost effective than spray or dip coating and produces a roller with less defects. The baked polydiene-based roll of this invention mimics the electrical performance of the coated roller and gives excellent print performance over a wide range of process speeds.

However, during the functional life of the roller, that material set is susceptible to further oxidation, also known as aging or oxidative aging, which may have a deleterious effect on the properties of the roller.

DISCLOSURE OF THE INVENTION

In accordance with this invention, an antioxidant material such as a hindered phenol is employed to minimize the additional oxidation of the roller during its functional life. The antioxidant material extends the useful life of the roller by approximately ten times or more while continuing to provide excellent print performance.

The roller of this invention is a cast urethane, electrically conductive rubber roller with a surface layer of high electrical resistivity. This roller mimics the electrical properties of a coated roller. The roller is composed of a polydiene, such as polyisoprene and more specifically polybutadiene, either as a polyol or a urethane prepolymer, blended with a second polyurethane prepolymer and a conductive additive such as ferric chloride. The bulk resistivity of the roller is approximately $1\times10^8$ (one times ten to the eighth power) ohmn-cm at 22° C. and 50% relative humidity. The surface of the cured roller is oxidized to produce a surface layer of material with high electrical resistivity. Oxidation of the roller is achieved by baking the roller in air at fairly high temperature (greater than 80 degrees C.) for several hours. The reaction of the oxygen with the polybutadiene, catalyzed by the ferric chloride, oxidizes the surface of the roller. The oxidized layer is very resistive. The cost of production is low.

BEST MODE FOR CARRYING OUT THE INVENTION

In electrophotography, the developer roller function is to develop a layer of toner on a photoconductor drum charged in an image pattern. A two layer, "coated" roll will develop a fixed quantity of toner per volt of development bias that is determined by the dielectric thicknesses of the photoconductor, the toner and the developer roller. This development characteristic is independent of process speed, within limits. In contrast, a solid roll of a single resistivity develops a quantity of toner based on the dielectric constants of the photoconductor and the toner, and the resistance of the roll in the photoconductor nip. This is dependent on process speed. In addition, a two-layer roll has a longer time constant than a solid roll. Longer time constant materials leave a higher effective development surface potential on the developer roll at the entry to the photoconductor nip. This improves the single pel dot print performance of the roll.

Therefore, the print performance of a two-layer roller is superior to that of a solid roll across a wide process speed range and is less sensitive to office environments. The desired electrical properties during normal operation of a two-layer roller are a core resistivity less than $1\times10^9$ ohm-cm, preferably less than $3\times10^8$ ohm-cm, at 22° C. and 50% relative humidity (RH), a coating resistivity of $5\times10^9$–$2\times10^{12}$ ohm-cm, preferably $1\times10^{11}$ ohm-cm, at 22° C. and 50% RH and a coating thickness of approximately 50–150 microns, preferably approximately 100 microns, at 22° C. and 50% RH. The time constant should be about 5–2,000 milliseconds, preferably about 100 milliseconds, at 22° C. and 50% RH.

A common technique to produce a semi-conductive roll with a resistive layer is to prepare a core using any standard rubber molding technique, such as casting liquid urethanes or rubber transfer molding. The core is then ground to the correct dimensions and either spray or dip coated with a resistive material to the desired thickness. The coating is usually applied in several layers to build up to the desired thickness of 100 microns. Problems with this process include its higher cost due to the multiple coating steps and the defects introduced into the surface layer during the coating process.

Using the unique combination of materials described in this specification, a resistive surface layer can be produced on a cast urethane roll simply by baking in air at elevated temperature. The oxidation of the polybutadiene, in the presence of ferric chloride, produces a high resistive layer at the surface. The thickness and resistivity of this layer can be controlled by varying the polybutadiene level, the ferric chloride level, the baking time, the baking temperature, and the oxygen level. However, the residual materials in the roller after this controlled oxidation process to form the resistive surface layer render the roller susceptible to further oxidation which is accelerated by higher temperatures that may possibly be encountered in both storage prior to use or during functional life in a printer.

This invention includes the use of a blend of a urethane prepolymer with polybutadiene, either in diol or urethane prepolymer form, and ferric chloride as a conductivity modifier. The blend of materials is cured in roll form and then baked at elevated temperatures (≧80 C.) for various times to oxidize the surface of the roll. This oxidation produces a layer of high resistivity material on the surface of the roll.

Polycaprolactone urethane prepolymer, such as Vibrathane 6060 (trademark product of Uniroyal Chemical), is the preferred base urethane because of its stable electrical resistivity with temperature and humidity changes. Vibrathane 6060 is a polycaprolactone ester toluene-diisocyanate prepolymer. Ferric chloride is added to the urethane to reduce the electrical resistivity of the roll core to $<1\times10^9$ ohm-cm. The combination of polycaprolactone urethane and ferric chloride produces a roller with a single resistivity from the roll surface to the center or core. In order to produce a roller with a high resistivity surface layer, a polydiene must be included in the formulation.

Polybutadiene prepolymers are prepared by the reaction of a polybutadiene diol (PBD) with toluene diisocyanate (TDI). This PBD-TDI prepolymer can be blended with the caprolactone prepolymer in various proportions. A suitable polybutadiene prepolymer is an experimental product of Uniroyal Chemical. The blend of prepolymers is cured with polyol curatives, such as Voranol 234–630, (trademark product of Dow Chemical Co., Inc.), a trifunctional polyether polyol. Typical polycaprolactone/polybutadiene blend ratios range from 95/5 parts by weight per hundred parts of total rubber which includes the polycaprolactone and the polybutadiene to 60/40 parts by weight.

In an alternative formulation, the polycaprolactone urethane can be cured by using a combination of polybutadiene diol (such as poly bd (trademark) R-45HT, a product of Elf Atochem) with a trifunctional curative such as the Voranol 234–630. The poly bd® R-45HT polybutadiene has a molecular weight Mn, of 2800 and a mnicrostructure of 20% cis-1, 4-polybutadiene, 60% trans-1, 4-polybutadiene and 20% 1,2-polybutadiene. Voranol 234-630 is a polyether polyol with a functionality of 3. In this case, the polybutadiene diol acts as a polymer chain extender for the urethane. Typical weight ratios of the Voranol to the poly bd® R-45 HT range from 1/0 up to 1/7 by weight.

The polybutadiene prepolymer is a very highly resistive material. The addition of high levels of conductive additives in powder form such as copper (II) chloride or ferric chloride does not lower the electrical resistivity of this material. In contrast, addition of 0.1 parts per hundred rubber by weight ferric chloride powder to one hundred parts by weight polycaprolactone urethane reduces the electrical resistivity from the $5\times10^{10}$ ohm-cm range to approximately $1.5\times10^8$ ohm-cm. Ferric chloride is not soluble in the polybutadiene prepolymer.

Ferric chloride is added to the polybutadiene/polycaprolactone urethane blend to reduce the blend bulk resistivity to $<1\times10^9$ ohm-cm. Typical concentrations of ferric chloride range from 0.05–0.30 parts by weight per hundred by weight rubber. Other conductive additives in powder form, such as ferrous chloride, calcium chloride and cobalt hexafluoroacetylacetonate are alternatives to the ferric chloride.

The urethane formulation is then cast into a mold around a central, metal shaft and then cured at approximately 100 degrees C. for 16 hours using a combination of curing in a mold, demolding and postcuring in an oven to produce a rubber roller. The roller is then ground to the correct dimensions. This roller does not have a resistive layer on the surface. The resistive layer is produced by baking the ground roll in air at an elevated temperature for some length of time. This baking procedure oxidizes the ferric chloride and the polybutadiene. The polybutadiene is highly unsaturated, which makes it very susceptible to oxidation. The presence of ferric chloride is necessary to catalyze this oxidation process. Example 1 illustrates a formulation and the processing conditions for using such a combination of materials. A highly resistive layer is not formed in the presence of copper (II) chloride since copper (II) chloride does not sufficiently catalyze the oxidation reaction to produce a high resistance surface layer.

The oxidation of polybutadiene in the presence of ferric chloride produces a highly resistive surface layer. The thickness and electrical resistivity of this surface layer can be controlled by varying the concentration of ferric chloride, concentration of polybutadiene, the baking temperature, the level of oxygen and the baking time.

After processing of the roller there is a possibility for further oxidation to occur even at room temperature (ca. 22° C.). Without an antioxidant the thickness of the resistive surface layer can increase which alters the print performance of the roller during its lifetime. Therefore, an antioxidant needs to be added to the roller to extend its useful life which provides for both an extended storage life prior to use as well as an extended functional life.

The antioxidant material may be chosen from the major classes of antioxidants standard to the rubber industry; for example aromatic amines, such as a diphenylamine or a dihydroquinoline; phenols, such as a substituted phenol; or a hydroperoxide decomposer, such as a phosphate or sulfide. The antioxidant may be added to the roll either during the casting of the blended raw materials or in a post-treatment process. The addition of an antioxidant during the casting process will require a modification of the oxidative bake process to form the resistive surface layer by requiring either a higher oxidative baking temperature and/or a longer baking time. Antioxidants such as a hindered phenol, e.g., 2,6-di-tertiarybutyl-4-methyl-phenol also known as BHT or 2,2'-methylenebis (4-methyl-6-tertiarybutyl) phenol also known as CYANOX 2246 from Cytec Industries can be used. The antioxidant can be added to the roll by pre-blending into the polybutadiene diol or prepolymer raw material and then casting the roll using the standard type of process described previously or applied using a post-treatment process such as dip or spray coating a dilute solution of the antioxidant onto the roll surface and allowing for diffusion of the antioxidant into the rubber roll. The concentration of antioxidant may vary depending on the type of antioxidant used and the method of addition into the roll. For example the concentration of BHT used when added to the roll during casting of the mixed urethane raw materials may range from 0.05% by weight (w/w) to 1.0%, with a preferred range of 0.08% (w/w) to 0.40% (w/w). Also, the concentration of CYANOX 2246 when added to the roll in a post-treatment process such as dip coating by dissolving in a solvent may range from 2.0% to 28.0% (w/w) with a preferred range of 10.0% to 20.0% (w/w). Examples 2 and 3 illustrate formulations and the processing conditions for using such materials and processes.

The rollers are characterized by a variety of electrical techniques. A roll is typically cleaned with isopropyl alcohol and may be painted with conductive carbon paint in a 10 mm strip down the roll. Alternatively, a 10 mm strip of conductive carbon tape is placed down the roll. A circuit is made by making electrical contact with the painted surface and the roller shaft. The DC resistivity of the roll at 100 V, the AC resistivity of the roll at 1 KHZ, and the time constant are measured. The time constant is measured by applying a 100 volt bias to the roll, removing the voltage and measuring the time for voltage on the roll to decay to 1/e (37%) of its original value. This time constant is related to the thickness and resistivity of the surface layer on the roll. The roller is modeled as two parallel RC circuits in series. One RC circuit represents the core and the second represents the coating. Based on this model, the following equations apply:

$tau=R * C=rho_c * Kc * epsilon_o$ $rho_c=tau/(Kc* epsilon_o)$ $T=R * A/rho_c$ where tau=time constant $rho_c$=coating resistivity C=capacitance Kc=dielectric constant of coating $epsilon_o=8.85\times10^{-12}$ Coulombs$^2$/Newtons×Meters$^2$ (permittivity of free space)

T=thickness of resistive layer

R=roll DC resistance

A=surface area of roll

Therefore, the coating thickness and resistivity can be calculated from the time constant and DC resistance measurements. The dielectric constant of the coating is assumed to be 10, a typical value for polyurethane rubber.

Test observations show that the addition of antioxidant to the roller dramatically improves the roller performance and even after aging 140 days at 43° C. shows acceptable electrical properties while the roller without antioxidant shows unacceptable thickness after aging only 39 days at 43° C. The application of antioxidant to the roller using a dip coating process shows a dramatic improvement and even after aging 11 days at 80° C. shows acceptable electrical properties compared to aging 1 day at 80° C. for the roller without antioxidant, an improvement of more than 11 times.

Increasing the polybutadiene level increases the resistivity of the coating. Increasing the time and temperature of baking increases both the coating thickness and the coating electrical resistivity. By the correct combination of polybutadiene level and baking conditions, a roller with a resistive surface layer of between $5\times10^9$ and $2\times10^{12}$ ohm-cm and a surface layer thickness of approximately 50–150 microns measured at 22° C. and 50% relative humidity can be produced.

The resistive surface layer produced by the oxidation process is permanent. Rolls with antioxidant have been analyzed for several months at 22° C. and at higher temperatures such as 43° C. and 80° C. for an appropriate shorter duration without a significant change in electrical properties.

Print test results of oxidized polybutadiene rolls containing antioxidant indicate they have excellent print performance across a wide speed range. Their performance mimics that of a conductive roll coated in a separate process with a resistive material.

It is not uncommon for an office environment to have a high humidity and for a printer, particularly a developer roller inside a printer, to be exposed to a high operating temperature (>40° C.). Polyurethane can degrade when exposed to a high level of moisture such as 80% relative humidity for a prolonged period of time and high temperature can accelerate the degradation of urethane rubber. Also, an acid source will accelerate the degradation. The addition of ferric chloride, which is a highly acidic material, to polyurethane will accelerate the degradation of the urethane. Degradation is defined as the loss in durometer hardness over time and is characterized herein as a loss in durometer hardness when exposed to a high temperature and high humidity environment such as 60° C. and 80% relative humidity for a specified period of time. The use of a hydrolytic stabilizer is required to maintain the roll physical and electrical properties over a long period of time and at various environmental conditions. The addition of TIPA (trademark of Dow Chemical Co.) (chemically, triisopropanolamine 99) acts to hydrolytically stabilize the described urethane-based developer roll.

Specific working applications of this invention include:

Example 1

| (CONTROL*) | By Weight |
|---|---|
| Vibrathane 6060 prepolymer | 83.06% |
| poly bd ® R-45HT diol | 12.00% |
| Voranol 234–630 polyol | 4.68% |
| Ferric chloride | 0.17% |
| Triisopropanolamine | 0.10% |

Oxidative bake process: 7 hours at 90° C.
*variations based on the various raw material lots are anticipated and known to those skilled in the art of polyurethane formulating Example 2

| | By Weight |
|---|---|
| Vibrathane 6060 prepolymer | 82.75% |
| poly bd ® R-45HT diol | 12.00% |
| Voranol 234–630 polyol | 4.66% |
| Ferric chloride | 0.17% |
| BHT** | 0.33% |
| Triisopropanolamine | 0.10% |

Oxidative bake process: 10 hours at 110° C. (laboratory scale); 12 hours at 100° C. (production scale)
** BHT = 2,6-di-tertiarybutyl-4-methyl-phenol is dissolved into the poly bd ® R-45HT diol Example 3

| | By Weight |
|---|---|
| Vibrathane 6060 prepolymer | 83.06% |
| poly bd ® R-45HT diol | 12.00% |
| Voranol 234–630 polyol | 4.68% |
| Ferric chloride | 0.17% |
| Triisopropanolamine | 0.10% |

Oxidative bake process: 7 hours at 90° C.
Post-treatment process:
Materials: 10% (w/w) concentration of CYANOX 2246 from Cytec Industries (a.k.a. 2,2' methylenebis (4-methyl-6-tertiarybutyl)phenol) dissolved in toluene
Process: expose roll to 10% (w/w) CYANOX 2246/toluene solution for 120 seconds using a dipping process, followed by rinsing the roll with solvent such as methanol for 12 seconds to clean the roll surface followed by a drying step (80° C. for 30 minutes) to remove the residual solvent Variations will be apparent and can be anticipated. Patent coverage is sought as provided by law, with particular reference to the accompanying claims.

We claim:

1. An endless developer member comprising a body of polycaprolactone ester toluene-diisocyanate polyurethane, ferric choloride filler, a polydiene diol selected from the group consisting of polyisoprene diol and polybutadiene diol, and antioxidant which electrically stabilizes said member, said member having an outer surface of oxidized segments of the polydiene diol.

2. The developer member as in claim 1 in which said antioxidant is in only said outer surface.

3. The developer member as in claim 2 in which said antioxidant is 2,2'-methylenebis (4-methyl-6-tertiarybutyl) phenol.

4. The developer member as in claim 3 in which said polydiene is polybutadiene diol.

5. The developer member as in claim 2 wherein which said polydiene is polybutadiene diol.

6. The developer member of claim 1 in which said polydiene is polybutadiene diol.

7. The developer member as in claim 1 in which said antioxidant is 2,6 di-tertiarybutyl-4-methyl-phenol .

8. The developer member as in claim 7 in which said polydiene is polybutadiene diol.

* * * * *